United States Patent [19]
Tsunoda et al.

[11] Patent Number: 4,756,663
[45] Date of Patent: Jul. 12, 1988

[54] METHOD FOR OPERATING PUMPS

[75] Inventors: Sachio Tsunoda; Katsunori Shirasu, both of Yokohama, Japan

[73] Assignee: Tokyo Shibaura Denki Kabushiki Kaisha, Kawasaki, Japan

[21] Appl. No.: 221,357

[22] Filed: Dec. 29, 1980

[30] Foreign Application Priority Data

Dec. 28, 1979 [JP] Japan .................... 54-173294

[51] Int. Cl.$^4$ .............................................. F03B 3/10
[52] U.S. Cl. .......................................... 415/1; 290/52; 415/500
[58] Field of Search ...................... 415/1, 500; 417/53; 290/52

[56] References Cited
U.S. PATENT DOCUMENTS

| | | | |
|---|---|---|---|
| 2,246,472 | 6/1941 | Sharp | 290/52 |
| 3,282,563 | 11/1966 | Willi | 415/500 |
| 3,309,057 | 3/1967 | Tonooka | 415/500 |
| 3,890,059 | 6/1975 | Takase | 415/500 |
| 4,318,004 | 3/1982 | Tsunoda | 415/500 X |
| 4,363,597 | 12/1982 | Tsunoda | 415/1 |

FOREIGN PATENT DOCUMENTS 54-144529 11/1979 Japan ..................... 415/1

Primary Examiner—Richard E. Gluck
Attorney, Agent, or Firm—Oblon, Fisher, Spivak, McClelland & Maier

[57] ABSTRACT

A method for operating pumps in a pumping-up power plant having a single speed reversible pump-turbine and a booster pump, the booster pump being provided in a branch pipe which is provided in parallel with a portion of a draft tunnel between the pump-turbine and a lower reservoir, is disclosed. The method includes the steps of, closing guide vanes of the pump-turbine, opening the portion of the draft tunnel which runs in parallel with the branch pipe, closing the branch pipe, then starting the pump-turbine in air as a pump, and starting the booster pump. After the rotational speed of the pump-turbine reaches a predetermined value and the rotational speed of the booster pump reaches a predetermined value, the method also includes the steps of, starting exhaustion of the air remaining inside the pump-turbine, closing the portion of the draft tunnel, opening the branch pipe, and opening the guide vanes of the pump-turbine after completion of the exhaustion and completion of closing the portion of the draft tunnel.

5 Claims, 3 Drawing Sheets

METHOD FOR OPERATING PUMPS

BACKGROUND OF THE INVENTION

1. Field of the Invention

This invention relates to a method for operating pumps, and more particularly to a method for starting pumps in a pumping-up power plant having a single speed reversible pump-turbine and a booster pump.

2. Description of the Prior Art

Generally, a single speed reversible pump-turbine has such characteristics that the maximum efficiency point in the turbine operational mode is different from that in pump operation mode.

Namely, the turbine net head where the efficiency in turbine operation is maximum is larger than the pump total head where the efficiency in pump operation is maximum. But in a practical pumping-up power plant, the turbine net head in turbine operation is smaller than the pump total head in pump operation by the head loss of the water way between an upper reservoir and a lower reservoir. Therefore, when a pump-turbine is operated as a turbine at a high efficiency speed or point, where the efficiency in pump operation is low, then it must be operated as a pump at a low efficiency point. Recently a new pumping-up power plant has been proposed where there is provided a booster pump in series with a single speed reversible pump-turbine in order to prevent low efficiency in pump operation of the pump-turbine. Namely, the booster pump is operated to provide a certain part of the necessary head for a high efficiency operation in the pumping-up power station in addition to the head generated by the pump-turbine. As pumping-up power plants are confronted by a keen demand for high efficiency operation of the pump-turbine from an economical standpoint, the demand for a method of operating a single speed reversible pump-turbine together with a booster pump is very promising. But many technical problems arise in the operation of a single speed reversible pump-turbine together with a booster pump, and an accurate control technique is necessary, especially in pump operation, for control in pump operation is very complicated.

SUMMARY OF THE INVENTION

Accordingly, one object of this invention is to provide a novel method for operating pumps in a pumping-up power plant having a single speed reversible pump-turbine and a booster pump, in which the pump turbine as a pump and the booster pump can be started in series with each other, simply, smoothly and promptly and without a complicated starting technique.

These and other objects of this invention can be achieved by providing a method for operating pumps in a pumping-up power plant having a single speed reversible pump-turbine and a booster pump, the booster pump being provided in a branch pipe which is provided in parallel with a portion of a draft tunnel between the pump-turbine and a lower reservoir. The method includes the steps of closing guide vanes arranged in a circular row around a runner in the pump-turbine, opening the portion of the draft tunnel which runs in parallel with the branch pipe, closing the branch pipe, then starting the pump-turbine in air as a pump, and starting the booster pump. After the rotational speed of the pump-turbine reaches a predetermined value and the rotational speed of the booster pump reaches a predetermined value, the method also includes the steps of, starting exhaustion of the air remaining inside the pump-turbine, closing said portion of the draft tunnel, opening the branch pipe, and opening the guide vanes in the pump-turbine after completion of the exhaustion and completion of closing said portion of the draft tunnel.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
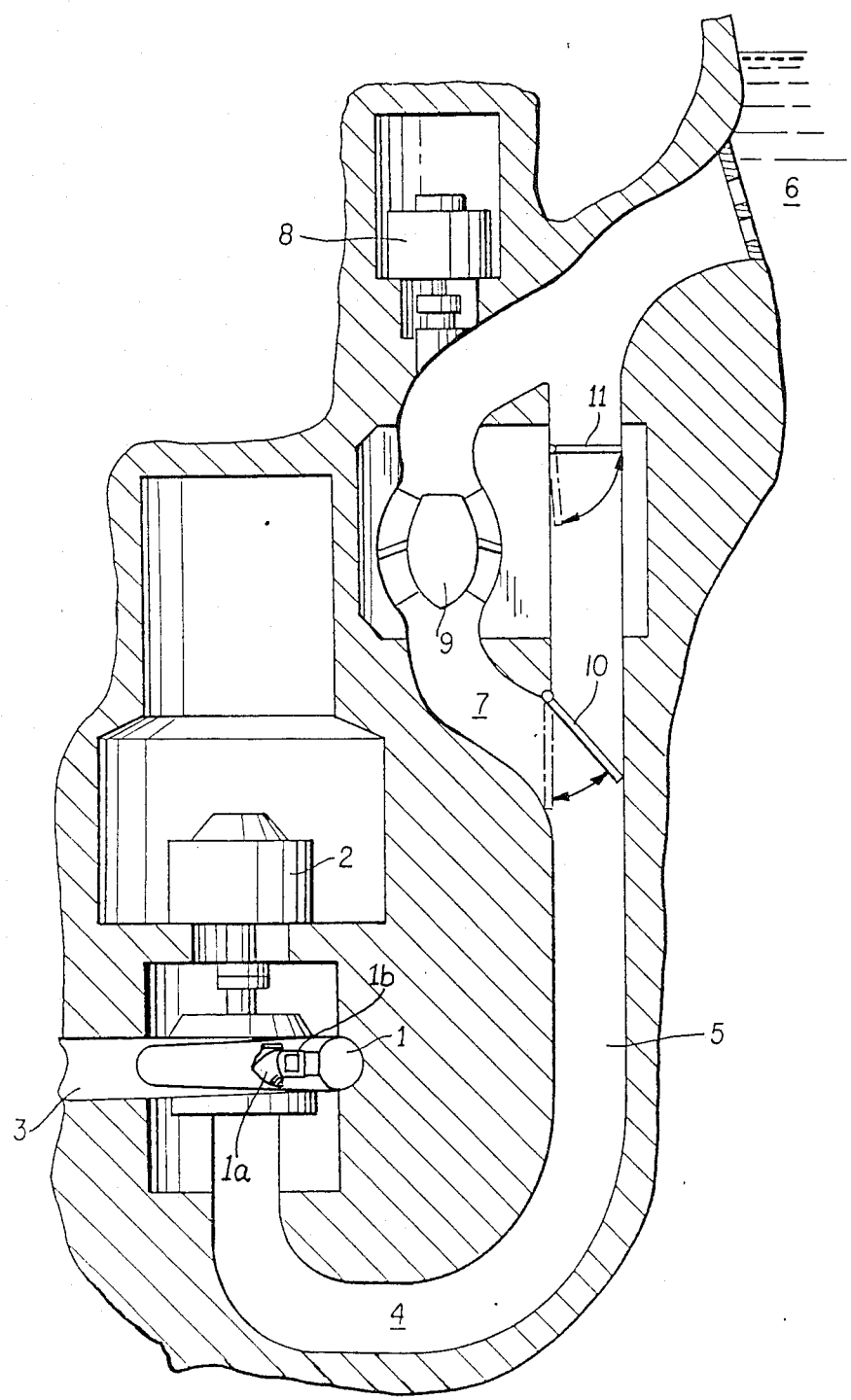
FIG. 1 is a schematic drawing of a pumping-up power plant which is used for applying this invention.

FIG. 1 shows a single-speed reversible pump-turbine 1, and a motor-generator 2 directly coupled to the pump-turbine 1. Also, there are shown a pipe line 3 connecting the pump-turbine 1 with an upper reservoir (not shown), a lower reservoir 6, a draft tunnel 5 connecting a draft tube 4 of the pump-turbine 1 with the lower reservoir 6, a branch pipe 7 provided in parallel with a portion of the draft tunnel 5 to bypass the draft tunnel 5, and a booster pump 9 in the middle of the branch pipe 7. Numeral 10 designates a gate disposed at the discharge side of the booster pump 9 in the branch pipe 7 and numeral 11 designates a second gate disposed in a portion of the draft tunnel 5 where the branch pipe 7 runs in parallel with the draft tunnel 5. Numeral 8 denotes a driving unit for driving the booster pump 9. To simplify the drawing, the connection between the booster pump 9 and the driving unit 8 is omitted, and the booster pump 9 is drawn only symbolically. There are also provided guide vanes (1b) in the pump-turbine 1 which act as a valve.

Now there will be described the operation of the pumping-up power plant with the above mentioned construction. Hereinafter the states of the gate 10 and the gate 11 are defined as follows: the solid line position of the gate 10 shows its open state and the broken line, its closed state; the solid line position of the gate 11 shows its closed state and the broken line, its open state in FIG. 1. First, in turbine operation of the pump-turbine 1, the gate 10 is moved to its broken line position to close branch pipe 7 and gate 11 is moved to its broken line position to open the draft tunnel 5, thereby directly connecting the draft tunnel 5 with the lower reservoir 6, and the pump-turbine 1 is run as a water turbine. FIG. 1 shows this position in broken lines. In this case water current introduced from an upper reservoir (not shown) is supplied to drive the pump-turbine 1 via the pipe line 3, and then flows out into the draft tube 4. The pump-turbine 1 performs a turbine operation, driving the motor-generator 2 to generate electric power. The current delivered to the draft tube 4 flows out into the lower reservoir 6 via the draft tunnel 5. At this time the booster pump 9 is not in operation.

In operating the pump-turbine 1 as a pump, on the other hand, the gate 10 is moved to its solid line position to open the branch pipe 7 and the gate 11 is moved to its solid line position to close the portion of the draft tunnel 5 running in parallel with the branch pipe 7. Accordingly, the draft tube 4 is connected to the lower reservoir 6 via the branch pipe 7 opening in the middle of the draft tunnel 5 and a portion of the draft tunnel 5 on the lower reservoir 6 side. FIG. 1 shows this position in solid lines. In this case, the pump-turbine 1 is driven by the motor-generator 2, while the booster pump 9 is driven by the driving unit 8. Since the pump-turbine 1 and the booster pump 7 are hydraulically connected in series with each other, water sucked from the lower reservoir 6 into the lower reservoir side portion of the draft tunnel 5 by the booster pump 9 flows into the pump-turbine 1 through the branch pipe 7, the portion of the draft tunnel 5 on the pump-turbine 1 side, and the draft tube 4, and is pressurized and forced up to the upper reservoir by means of the pipe line 3.

Hereinafter a method for starting the pump-turbine 1 as a pump and booster pump 9 according to this invention will be described in detail.

Figure 2:
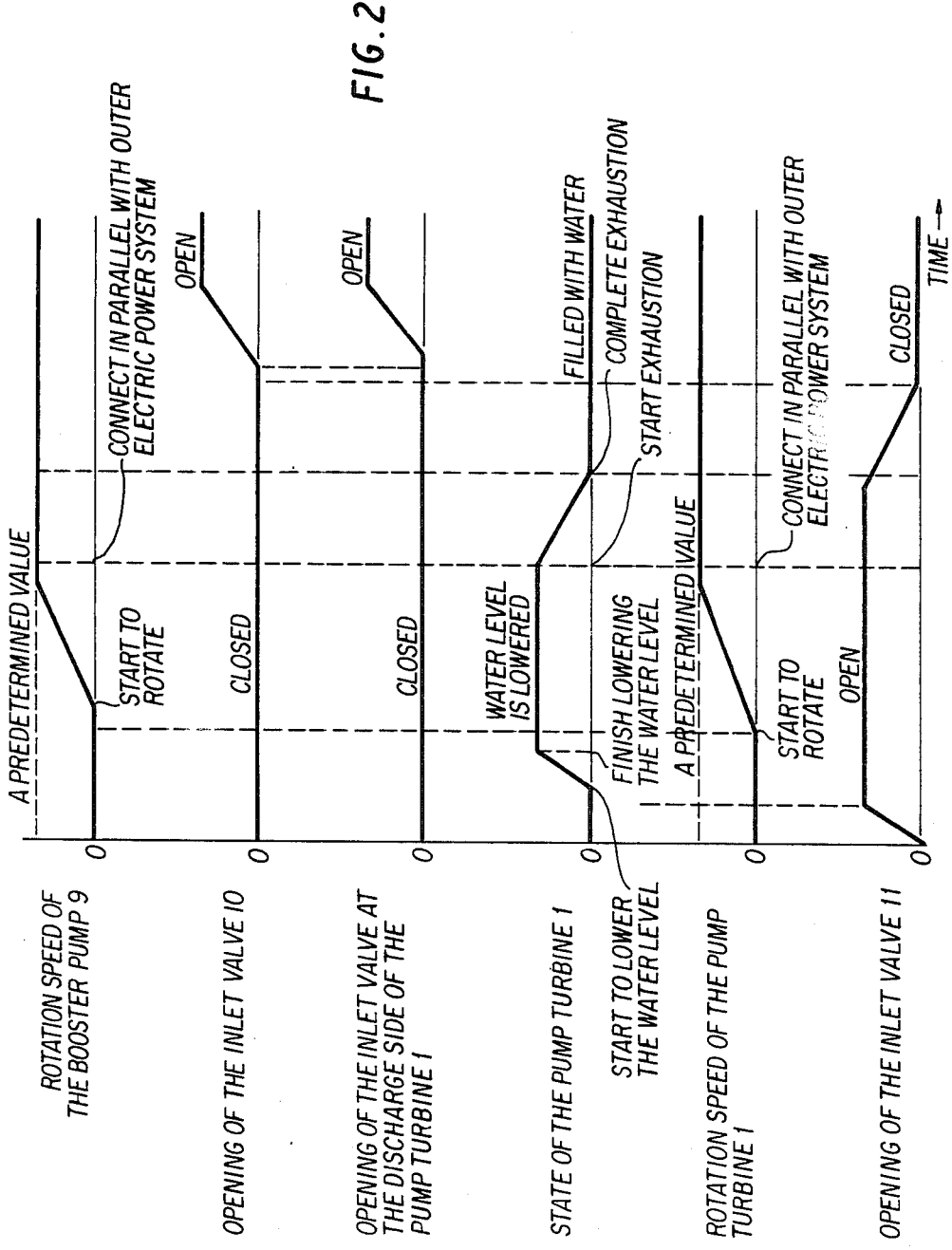
FIGS. 2 and 3 are diagrams illustrating the time sequence of preferred embodiments of this invention.

First the guide valves 1b of the pump-turbine 1 are closed, and the gate 10 is moved to its broken line position and the gate 11 is moved to its broken line position to close the branch pipe 7 and to open the portion of the draft tunnel 5 running in parallel with the branch pipe 7, respectively. Accordingly the inside of the pump-turbine 1 is connected with the lower reservoir 6 via the portion of the draft tunnel 5 running in parallel with the branch pipe 7. Then air is fed into the inside of the pump-turbine 1 by an air compressor (not shown) to lower the water level. When the water level reaches below the runner 1a of the pump-turbine 1 the pump-turbine 1 is started in air as a pump by a small capacity internal starter motor (not shown) connected to the motor generator 2. After the rotation speed of the pump-turbine 1 reaches a predetermined value, the pump-turbine 1 is connected in parallel with the outer electric power system. On the other hand, at the same time or sequentially after starting the pump-turbine 1, the booster pump 9 is started in water by an internal power source in the driving unit 8. When the rotation speed of the booster pump 9 reaches a predetermined value, the booster pump 9 is also connected in parallel with the outer electric power system. After the pump-turbine 1 is connected in parallel with the outer electric power system, the exhaustion of the air remaining inside of the pump-turbine 1 by a vacuum source (not shown) connected to the pump-turbine 1 is started. At, or near, the time when the exhaustion is completed, the gate 11 is moved to its solid line position to close the portion of the draft tunnel 5. After completion of closing the gate 11, the gate 10 is moved to its solid line position to open the branch pipe 7, and at the same time, or subsequently, the guide vanes 1b arranged in a circular row around a runner 1a in the pump-turbine 1 is opened to operate the pump-turbine 1 as a pump and the booster pump 9 in series with each other. FIG. 2 shows the time sequence of the operation described above.

According to this invention, the pump-turbine 1 and the booster pump 9 are controlled independently and simultaneously with each other, from the step of being started to the step of being connected in parallel with the outer electric power system, without interfering with one another due to changes of water pressure or water flow resulting from the starting of the other, in the condition where the water way is closed between the booster pump 9 and the pump-turbine 1 due to closing the gate 10. Therefore the pump-turbine 1 as a pump and the booster pump 9 can be started and connected in parallel with the outer electric power system smoothly and promptly.

Moreover the air remaining inside of the pump-turbine 1 is exhausted in the condition where the static water pressure from the lower reservoir 6 is applied to the pump-turbine 1 by connecting the pump-turbine 1 with the lower reservoir 6. Therefore such exhaustion can be completed very safely.

Also, as the exhaustion is completed, the gate 11 is operated to be closed in the condition where the gate 10 is in the closed position and only the static water pressure from the lower reservoir 6 is applied to the gate 11. Therefore the gate 11 can be operated to be closed safely.

Moreover the inlet valve at the discharge side of the pump-turbine 1 is opened at almost the same time that the gate 10 is opened. Therefore the pump turbine 1 as a pump and the booster pump 9 can be smoothly operated in series with each other in the pumping-up operational mode, without a high closing pressure of the booster pump 9 being applied to the draft tube 4 and the portion of the draft tunnel 5 between the booster pump 9 and the pump-turbine 1.

Figure 3:
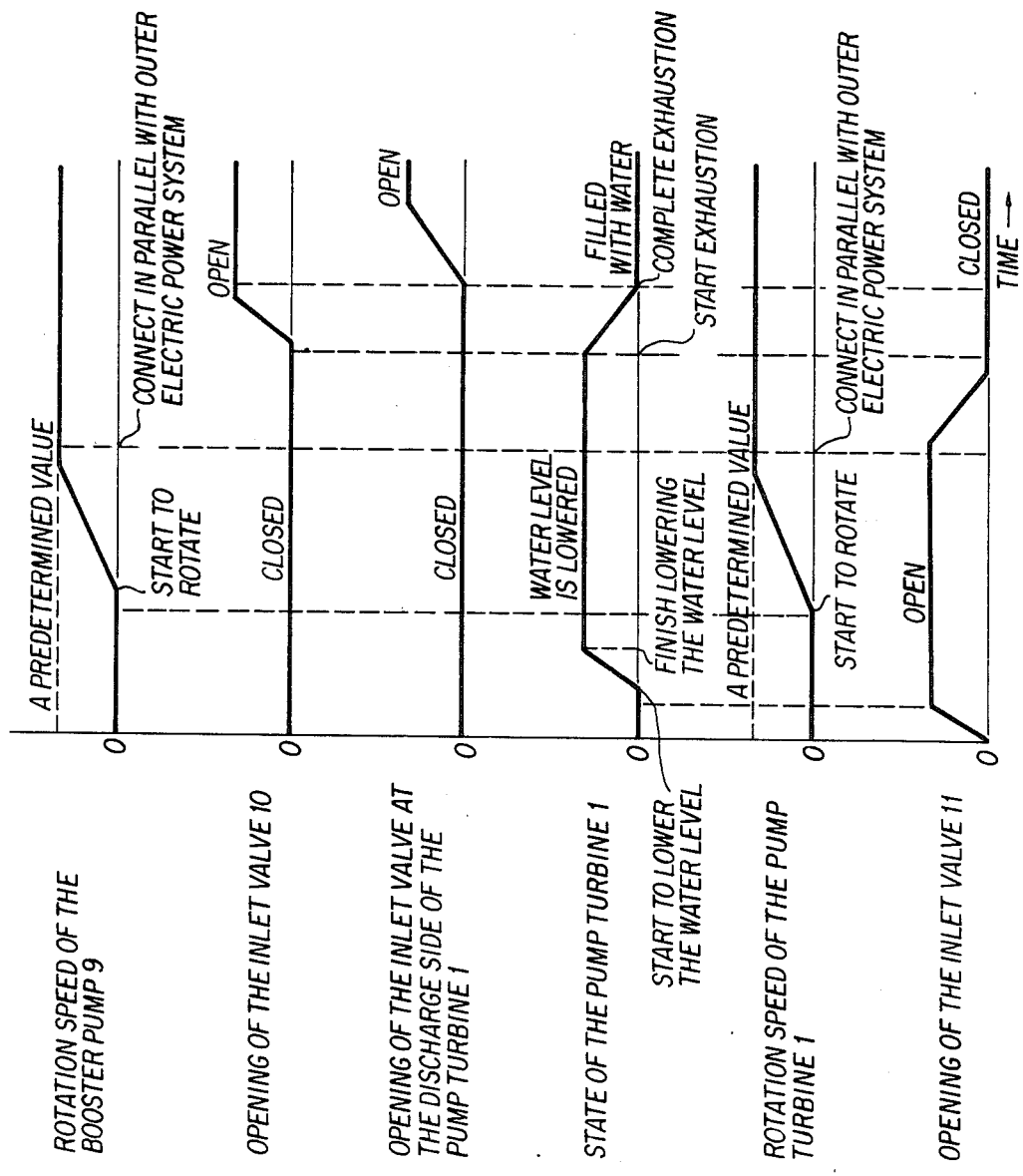

In the embodiment of this invention described above, the inlet valve 11 is moved to its solid line position to close the portion of the draft tunnel 5 at, or nearly at, the same time that the exhaustion is completed. But this invention is not restricted to this embodiment. For example, after the pump-turbine 1 is connected in parallel with the outer electric power system, the gate 11 is moved to its solid line position to close the portion of the draft tunnel 5. After completion of the closing of the inlet valve 11, the exhaustion of the air remaining inside of the pump-turbine 1 by a vacuum source (not shown) connected to the pump-turbine 1 may be started. After the exhaustion is started, the gate 10 may be moved to its solid line position to open the branch pipe 7. At the same time that such exhaustion is completed, the guide vanes 1b arranged in a circular row around a runner 1a in the pump-turbine 1 may be opened to operate the pump-turbine 1 as a pump-and the booster pump 9 in series with each other. FIG. 3 shows the time sequence of the operation described above.

In this case the gate 10 is moved to its solid line position to open the branch pipe 7 at the same time that the exhaustion is started. Therefore the water pressure generated by the rotation of the booster pump 9 is applied to the draft tube 4 of the pump-turbine 1, so that the exhaustion pressure in the pump-turbine 1 is raised and the exhaustion is finished rapidly. Also at the same time that the exhaustion is completed, the pump-turbine 1 as a pump and the booster pump 9 can be operated in series with each other in the pumping-up operational mode simply by opening the gate 10.

Moreover in the pumping-up power plant shown in FIG. 1, both terminals of the branch pipe 7 are connected to the draft tunnel 5. This invention can also be applied to a pumping-up power plant where one terminal of the branch pipe 7 is connected directly to the lower reservoir 6.

As described above, this invention can provide a method for operating pumps in a pumping-up power plant having a single speed reversible pump-turbine and a booster pump in which the pump-turbine as a pump and the booster pump can be started in series with each other, simply, smoothly and promptly without a complicated starting technique.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A method for operating pumps in a pumping-up power plant having a single speed reversible pump-turbine and a booster pump, said booster pump being provided in a branch pipe which is in parallel with a portion of a draft tunnel between said pump-turbine and a lower reservior; comprising the steps of:
    closing guide vanes of said pump-turbine;
    opening said portion of said draft tunnel which runs in parallel with said branch pipe;
    closing said branch pipe;
    starting said pump-turbine in air as a pump;
    starting said booster pump;
    after the rotational speed of said pump-turbine reaches a predetermined value and the rotation speed of said booster pump reaches a predetermined value, starting exhaustion of the air remaining inside said pump-turbine, closing said portion of said draft tunnel and opening said branch pipe; and
    opening said guide vanes of said pump-turbine after completion of said exhaustion and completion of closing said portion of said draft tunnel.

2. A method for operating pumps according to claim 1, wherein:
    in the step of starting said booster pump, said booster pump is started in water.

3. A method for operating pumps according to claim 2, wherein:
    the step of closing said portion of said draft tunnel is performed at approximately the time of the completion of said exhaustion; and
    the step of opening said branch pipe is performed after completion of closing said portion of said draft tunnel.

4. A method for operating pumps according to claim 2, wherein:
    the step of starting said exhaustion is performed after completion of closing said portion of said draft tunnel; and
    the step of opening said branch pipe is performed after starting said exhaustion.

5. A method for operating pumps according to claims 3 or 4, wherein:
    the step of opening said portion of said draft tunnel and the step of closing said branch pipe are performed by closing a first gate disposed at a discharge side of said booster pump in said branch pipe and opening a second gate disposed in said portion of said draft tunnel;
    the step of closing said portion of said draft tunnel is performed by closing said second gate; and
    the step of opening said branch pipe is performed by opening said first gate.

* * * * *